United States Patent [19]
Saji et al.

[11] Patent Number: 5,383,139
[45] Date of Patent: Jan. 17, 1995

[54] ELECTRONIC APPARATUS

[75] Inventors: Yoshito Saji, Ashiya; Yoshiteru Namoto, Ikoma; Osamu Kajino, Kadoma, all of Japan

[73] Assignee: Matsushita Electric Industrial Co., Ltd., Osaka, Japan

[21] Appl. No.: 51,643

[22] Filed: Apr. 26, 1993

[30] Foreign Application Priority Data

Apr. 24, 1992 [JP] Japan .................................. 4-106322

[51] Int. Cl.⁶ .............................................. G06F 1/00
[52] U.S. Cl. ............................................. 364/708.1
[58] Field of Search ...................... 364/708.1, 709.09

[56] References Cited
U.S. PATENT DOCUMENTS 3,992,077 11/1976 Schwartz ........................ 339/288
5,238,421 8/1993 Kobayashi ....................... 439/165

Primary Examiner—Roy N. Envall, Jr.
Assistant Examiner—Emmanuel Moise
Attorney, Agent, or Firm—Wenderoth, Lind & Ponack

[57] ABSTRACT

An image transmitting element connecting a display device accommodated in a display casing and an image output element accommodated in a main body casing with each other are composed of a sheet-shaped flexible cable having a wiring pattern. The image transmitting element is partly wound in a spiral between a fixing portion on the display casing side and a fixing portion on the main body casing side. The rotational axis of a hinge unit is disposed in the vicinity of the rear end of the main body casing. Owing to this construction, the motion of the image transmitting element which occurs due to the pivotal motion of the display casing is limited to a small space in which the wound portion of the image transmitting element is disposed whereby the image transmitting element is accommodated in the small space.

15 Claims, 8 Drawing Sheets

5,383,139

ELECTRONIC APPARATUS

BACKGROUND OF THE INVENTION

1. Field of the Invention

The present invention relates to an electronic apparatus such as a computer, having a compact construction, such as a laptop personal computer or a notebook personal computer in which a display portion is opened and closed.

2. Description of the Related Art

In recent years, CPUs have attained high performance; keyboards have had a large number of keys installed thereon with a high density; memory has become of large capacity; disk devices have become compact but with large capacity; and display devices comprising liquid crystals have become thin. Because of this tendency, an increasing number of compact personal computers have been manufactured. In particular, an increasing number of laptop personal computers or notebook personal computers have been manufactured in which a display section thereof is accommodated in a display casing while a main body section is accommodated in a main body casing. When this type of computer is used, the display section is pivoted toward a position in which an operator can view the display screen of the display section. When the computer is not being used, the display section is pivoted to close the display section like a cover. Therefore, the computer is handy to carry. This tendency will be also seen in an electronic apparatus such as a large scale computer including a work station.

Although the computer has become more and more compact, the size of the display screen and that of the keyboard thereof cannot be made smaller than a certain size in view of operational performance requirements of the computer. It is important for the display screen to be large, clear, and precise so that the computer is acceptable to an operator. Accordingly, in the compact electronic apparatus manufactured in recent years, the ratio of the area of the display screen to that of the main body casing is approximately 1:1. In such an electronic apparatus, the pivotal axis of the display casing accommodating the display section is disposed in the vicinity of the rear end of the main body casing.

A signal for driving the display means is transmitted from the circuit of the main body of the computer to the display means thereof at a high speed and is liable to be influenced by noises. In order to overcome this problem, a cable to connect the display means of the computer with the main body thereof has increasingly become sheet-shaped and flexible to perform a favorable grounding and conform to the arrangement requirements regarding signal lines. In order to movably wire the flexible cable between the display casing and the main body casing, it is necessary to form a large space in the vicinity of the pivotal axis of the display casing. In the above-described construction of the electronic apparatus, it is very difficult to install the pivotal axis of the display casing in the vicinity of the rear end of the main body casing.

An example of the construction of the conventional electronic apparatus is described below with reference to FIGS. 5 through 8.

FIG. 5 is a perspective view showing the configuration of the conventional electronic apparatus. FIG. 6 is a sectional side elevation showing the vicinity of a hinge unit of the conventional electronic apparatus. FIGS. 7 and 8 are perspective views showing the configuration of parts, of the conventional electronic apparatus, disposed in the vicinity of the hinge unit.

Referring to FIGS. 5 through 8, the electronic apparatus comprises a keyboard 126; a display means 114; a main body circuit 125 for controlling a signal to be transmitted to the display means 114 according to data inputted via the keyboard 126; a main body casing 121 accommodating the keyboard 126 and the circuit 125; a hinge unit 104; and a display casing 111, accommodating the display means 114, supported by the hinge unit 104 via a hinge portion 111c disposed in the vicinity of the rear end thereof so that the display means 114 is rotatable on the main body casing 121. The display casing 111 can be pivoted more than 90° from a closed state (state shown in FIG. 6b) to an open state (state shown in FIG. 6a.) In the closed state, the display casing 111 is closed like a cover so as to be portable. In the open state, an operator views the display screen of the display casing 111. Image signals and electrical power are supplied from the circuit 125 to the display means 114 via a long flexible cable 101 on which a wiring pattern has been printed. As shown in FIG. 7, the flexible cable 101 passes through a slit 111b of the display casing 111 and an opening 121a of the main body casing 121 shown in FIG. 8, thus extending from the display casing 111 to the main body casing 121. In pivoting the display casing 111 from the open state of FIG. 6a to the closed state of FIG. 6b, most of the hinge portion 111c can be seen from outside. Therefore, the exit, namely, the slit 111b of the display casing 111 through which the flexible cable 101 passes is necessarily small as shown in FIG. 8 while it is necessary to make the opening 121a of the main body casing 121 larger than the slit 111b as shown in FIG. 8 in correspondence with the flexure range of the flexible cable 101 which flexibly moves in the space between the display casing 111 and the main body casing 121.

An example of a method of manufacturing the conventional electronic apparatus is described below with reference to FIG. 9.

First, as shown by an arrow 1A, the circuit 125 and the hinge unit 104 are accommodated in the main body casing 121. A rear cover 112 is fixed to one end 104a of the hinge unit 104 projecting from the main body casing 121 with the rear cover 112 standing upright. Then, as shown by an arrow 1B, the display means 114 connected with one end of the flexible cable 101 is fixed to the rear cover 112, and the other end thereof is then inserted through the opening 121a of the main body casing 121 to connect the flexible cable 101 with the circuit 125 as shown by an arrow 1C. Finally, as shown by an arrow 1D, a front cover 113 is installed on the rear cover 112. The rear cover 112 and the front cover 113 compose the display casing 111.

In the electronic apparatus having the abovedescribed construction, however, it is necessary to provide an upper cover 121b in the rear of the main body casing 121 so that the opening 121a of the main body casing 121 and the flexible cable 101 cannot be seen from outside. Consequently, the apparatus is large in depth. In addition, the flexible cable 101 is flexed by large amount in the limited space between the display casing 111 and the circuit 125 in correspondence with the rotation of the display casing 111 while the rigidity of the flexible cable 101 prevents the display casing 111 from smoothly pivoting. Furthermore, the flexible cable 101 in the vicinity of the circuit 125 is required to be bent significantly at a small radius of curvature. Therefore, the flexible cable 101 is unreliable in its motion.

In addition, if the opening 111*b* of the display casing 111 is enlarged and the opening 121*a* of the main body casing 121 is reduced to solve the above-described problems, it is necessary to provide the electronic apparatus with a shutter or the like which moves synchronously with the pivotal motion of the display casing 111 so as to cover the opening 111*b* of the display casing 111. As a result, the construction of the apparatus becomes complicated.

Further, in the above-described manufacturing method, the display casing 111 cannot be removed from the main body casing 121 because the display casing 111 is not held together with the main body casing 121. Therefore, it is necessary to disassemble the display casing 111 each time the display means 114 requires maintenance. Moreover, it is inconvenient that the display casing 111 must be fixed to the main body casing 121 with the former standing upright. That is, it takes time and labor to locate the display casing 111 in position on the main body casing 121 with the former in the closed state.

SUMMARY OF THE INVENTION

It is an object of the present invention to provide a compact electronic apparatus in which a display casing is smoothly pivoted.

It is another object of the present invention to provide a method, for manufacturing an electronic apparatus, for facilitating the maintenance of the electronic apparatus and accurately positioning a display casing on a main body casing in fixing both casings to each other.

In accomplishing these and other objects of the present invention, in an electronic apparatus of the present invention, a hinge unit supports the vicinity of the rear end of a display casing accommodating display means in the range between the display casing and a main body casing and pivoting the display casing to a position at which the display casing stands upright. Image transmitting means connecting the display means accommodated in the display casing and image output means accommodated in the main body casing with each other is composed of a sheet-shaped flexible cable having a wiring pattern. The image transmitting means is partly wound spirally between a fixing portion on the display casing side and a fixing portion on the main body casing side. The rotational axis of the hinge unit is disposed in the vicinity of the rear end of the main body casing.

According to this construction, the motion of the image transmitting means which occurs due to the pivotal motion of the display casing is limited to a small space in which the wound portion of the image transmitting means is disposed. Accordingly, the image transmitting means is accommodated in the small space. Thus, the electronic apparatus is compact. In addition, the image transmitting means can be flexibly bent with at a large radius of curvature of the spirally wound portion thereof. Further, the guide members prevent twist or shearing forces from being applied to the image transmitting means. Moreover, the display casing can be smoothly pivoted without being influenced by the rigidity of the image transmitting means.

The image transmitting means comprises a first portion in the rotational axis direction of the hinge unit and a second portion in the circumferential direction of the hinge unit. The first portion is disposed both in the main body casing and the display casing and in the vicinity of the rotational axis of the hinge unit. The second portion is disposed inside the main body casing or the display casing and wound spirally.

The electronic apparatus further comprises a guide member for fixing the vicinity of the connection portion between the first portion of the image transmitting means and the second portion thereof to the main body casing or the display casing.

According to the configuration of the U-shaped image transmitting means 1, a material is used at a high efficiency.

A method for manufacturing an electronic apparatus comprises the steps of connecting an end of an image output means to display means; fixing a hinge unit to the display casing; accommodating the display means in the display casing; accommodating an image output means in the vicinity of an open portion of a main body casing; locating the display casing in position on the main body casing by means of a jig with the display casing placed on the main body casing; fixing a rotary portion of the hinge unit fixed to the display casing to the main body casing; connecting one end of the image transmitting means wound spirally with the image output means in the open portion of the main body casing; and covering the hinge unit and the image output means with a cover.

According to the above-described manufacturing method, the display casing can be mounted in position on the main body casing, and the display casing accommodating the display means can be removably mounted on the main body casing. Therefore, the maintenance of the display means can be easily performed.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
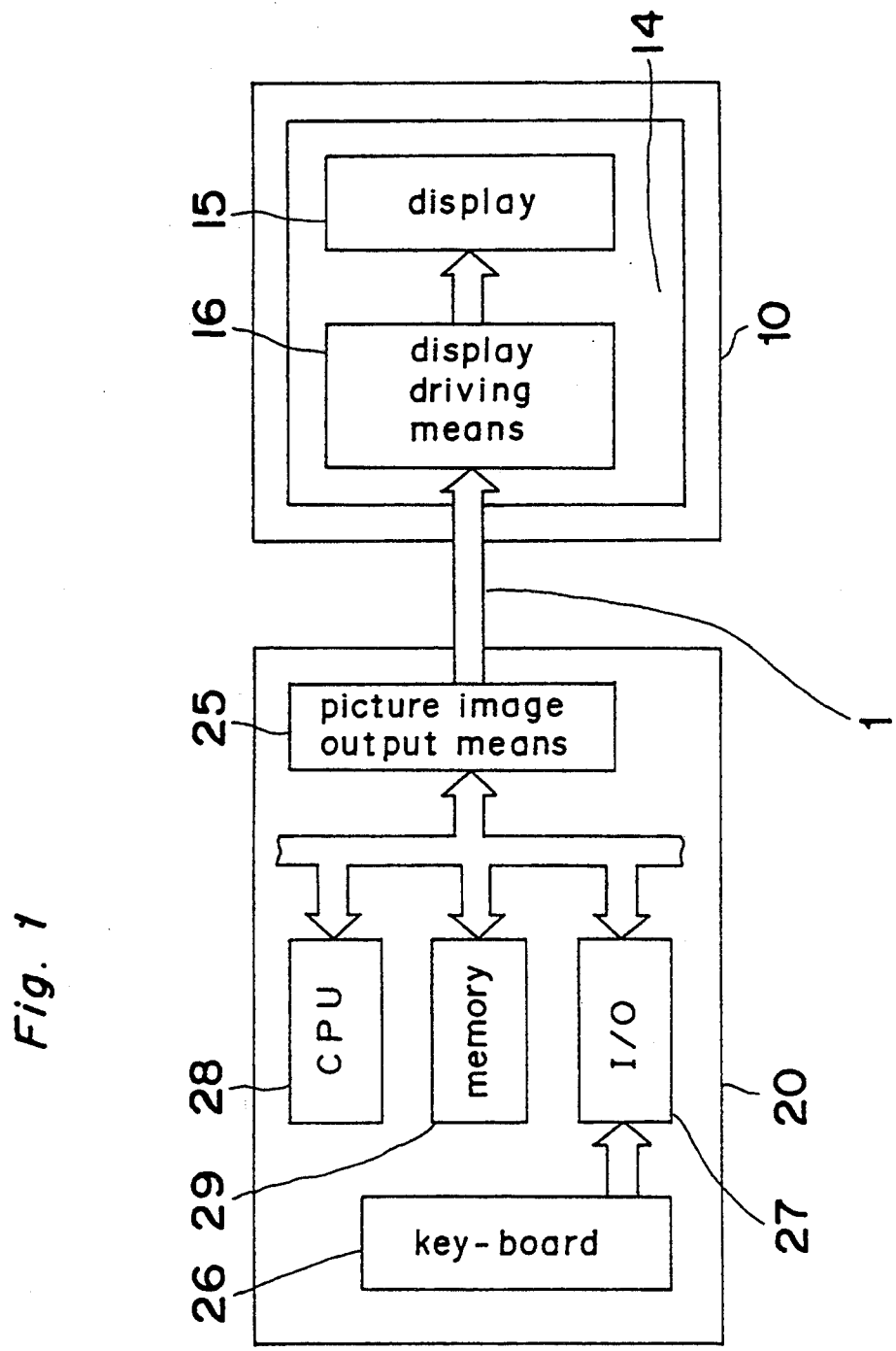
FIG. 1 is a block diagram showing a schematic construction of an electronic apparatus according to an embodiment of the present invention.

Before the description of the present invention proceeds, it is to be noted that like parts are designated by like reference numerals throughout the accompanying drawings.

An image transmitting means, an electronic apparatus, and a method for manufacturing the electronic apparatus according to an embodiment of the present invention will be described below with reference to the drawings.

FIG. 1 is a block diagram showing a schematic construction of the electronic apparatus according to the embodiment of the present invention. Referring to FIG. 1, the electronic apparatus comprises a display section 10 comprising a display means 14 accommodated in a casing; a main body section 20 accommodated in a casing; and an image transmitting means 1. The display means (or display section) 14 comprises a flat type display 15 such as a liquid crystal panel and a display-driving means 16 for electrically driving the display 15 so as to turn on pixels of the display 15. The main body section 20 comprises an image output means (or image output circuitry) 25; a CPU 28; a memory 29; an I/O circuit 27; and a key board 26. The CPU 28 reads necessary data from the memory 29 based on data inputted via the key board 26 and received by the I/O circuit 27, thus instructing the image output means 25 to generate image data to be displayed on the display 15. The transmitting means 1 transmits the image data from the image output means 25 to the display means 14. The CPU 28, the I/O circuit 27, and the memory 29 constitute a control means.

Figure 2:
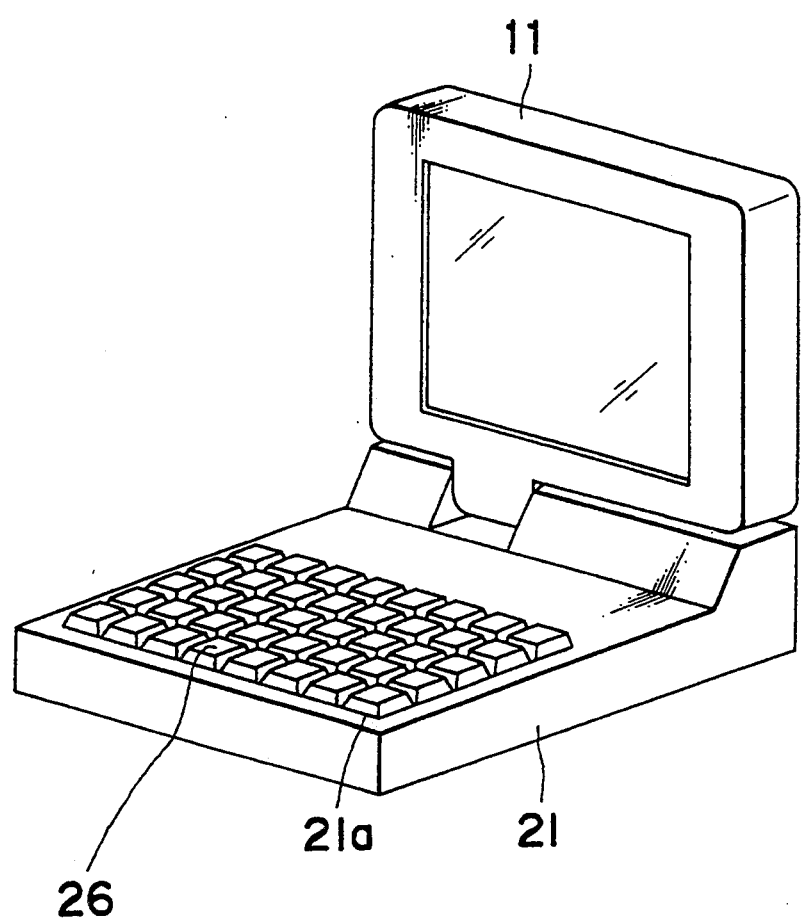
FIG. 2 is a perspective view showing a schematic construction of the electronic apparatus according to the embodiment.
Figure 3:
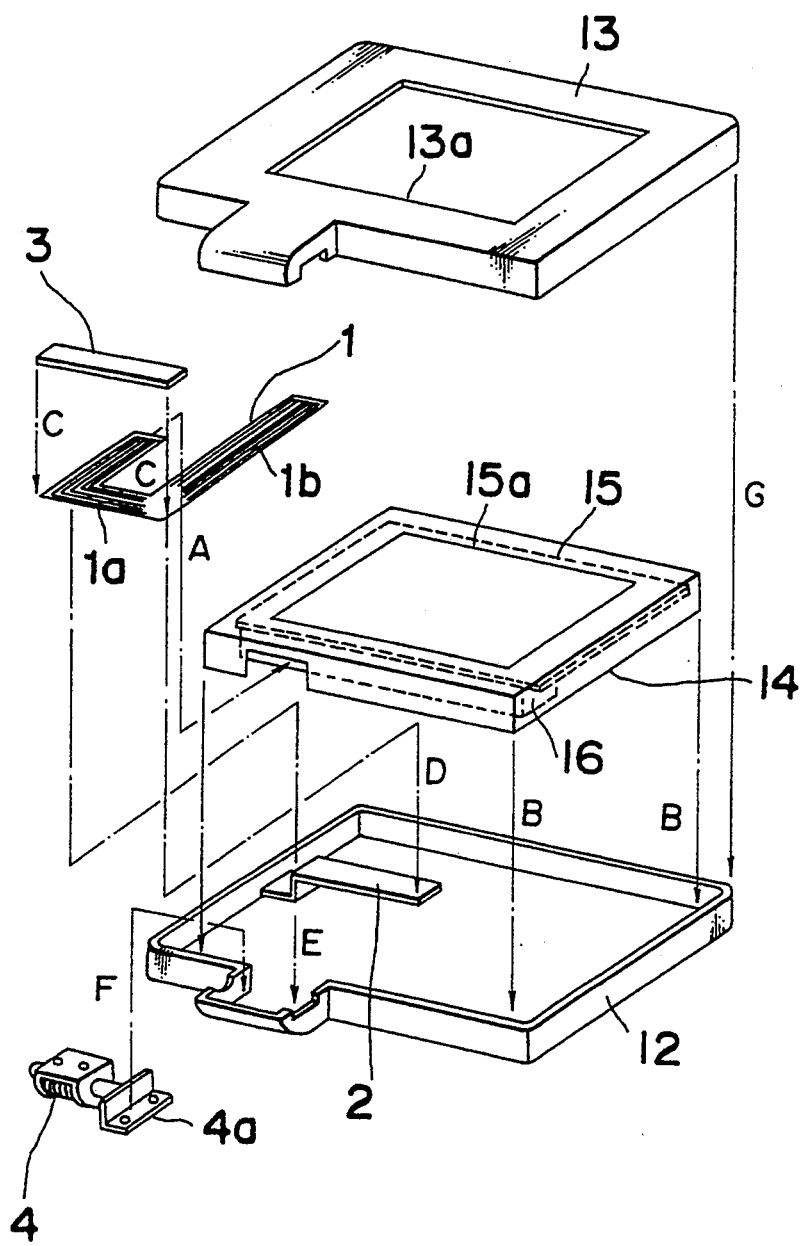
FIG. 3 is a perspective view showing a schematic construction of a display section of the electronic apparatus of FIG. 2 and an image transmitting means thereof according to the embodiment and a method for manufacturing the display section.
Figure 4:
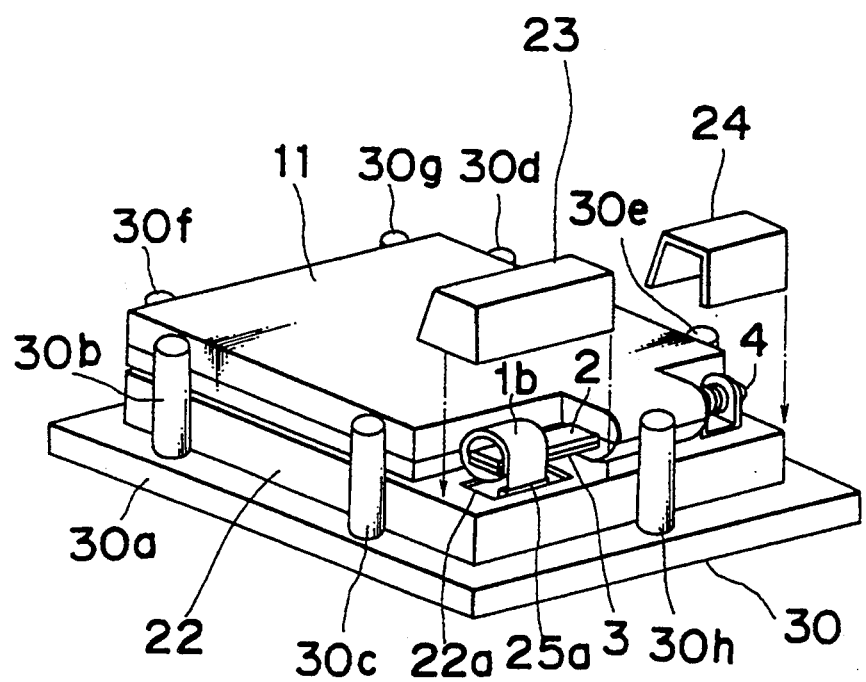
FIG. 4 is a perspective view showing a schematic construction of the electronic apparatus of FIG. 2 and a method for installing the display section of the electronic apparatus on a main body casing thereof according to the embodiment.
Figure 5:
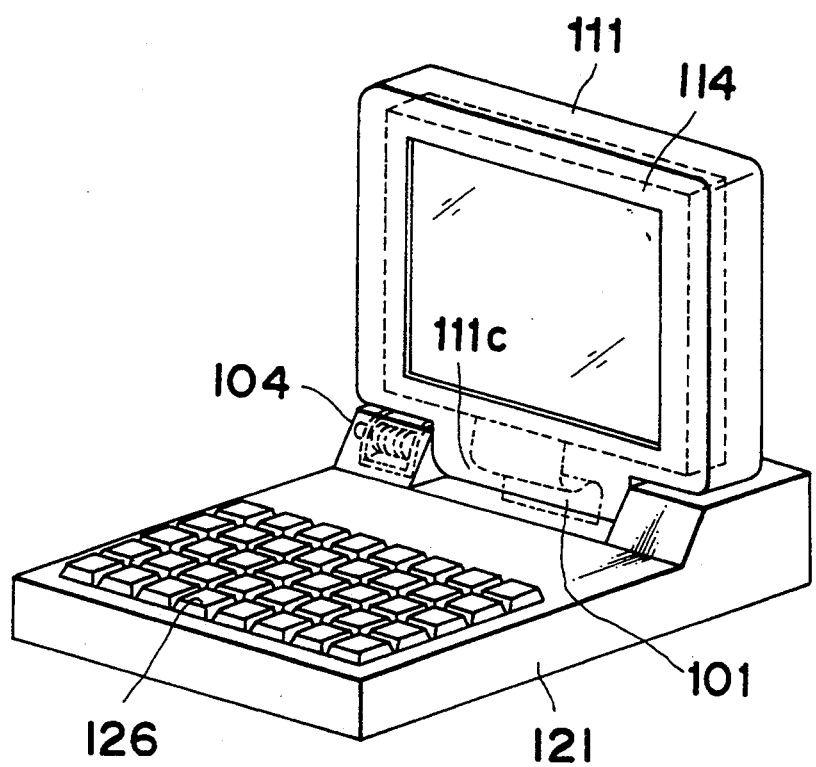
FIG. 5 is a perspective view showing a schematic construction of a conventional electronic apparatus.
Figure 6A:
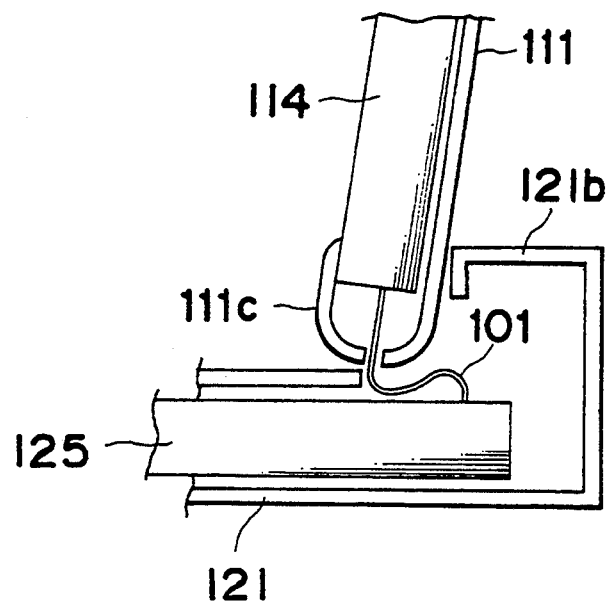
FIG. 6(*a*) and FIG. 6(*b*) are sectional side elevations showing the conventional electronic apparatus of FIG. 5.
Figure 6B:
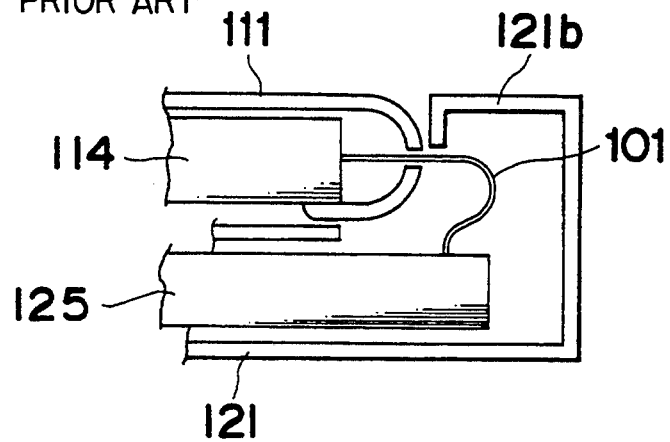
Figure 7:
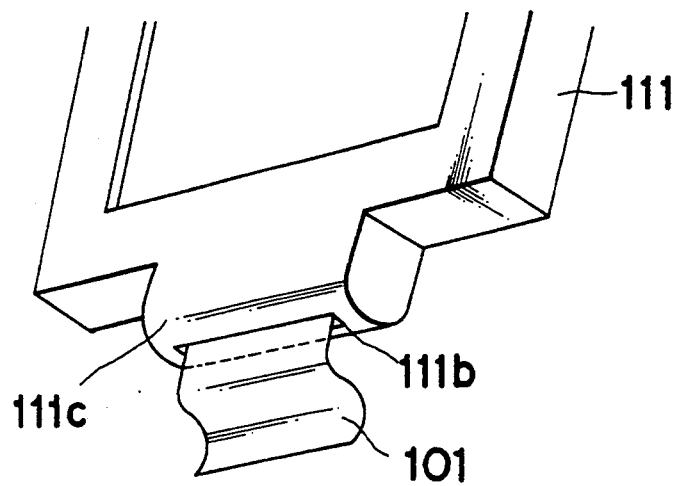
FIG. 7 is a perspective view showing a principal portion of the conventional electronic apparatus of FIG. 5.
Figure 8:
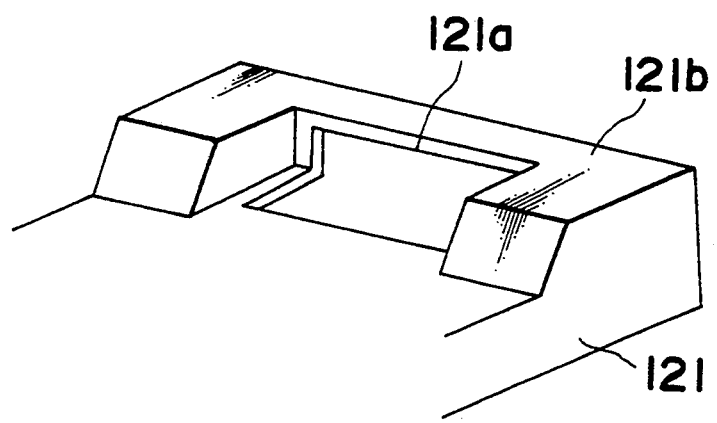
FIG. 8 is a perspective view showing a principal portion of the conventional electronic apparatus of FIG. 5.
Figure 9:
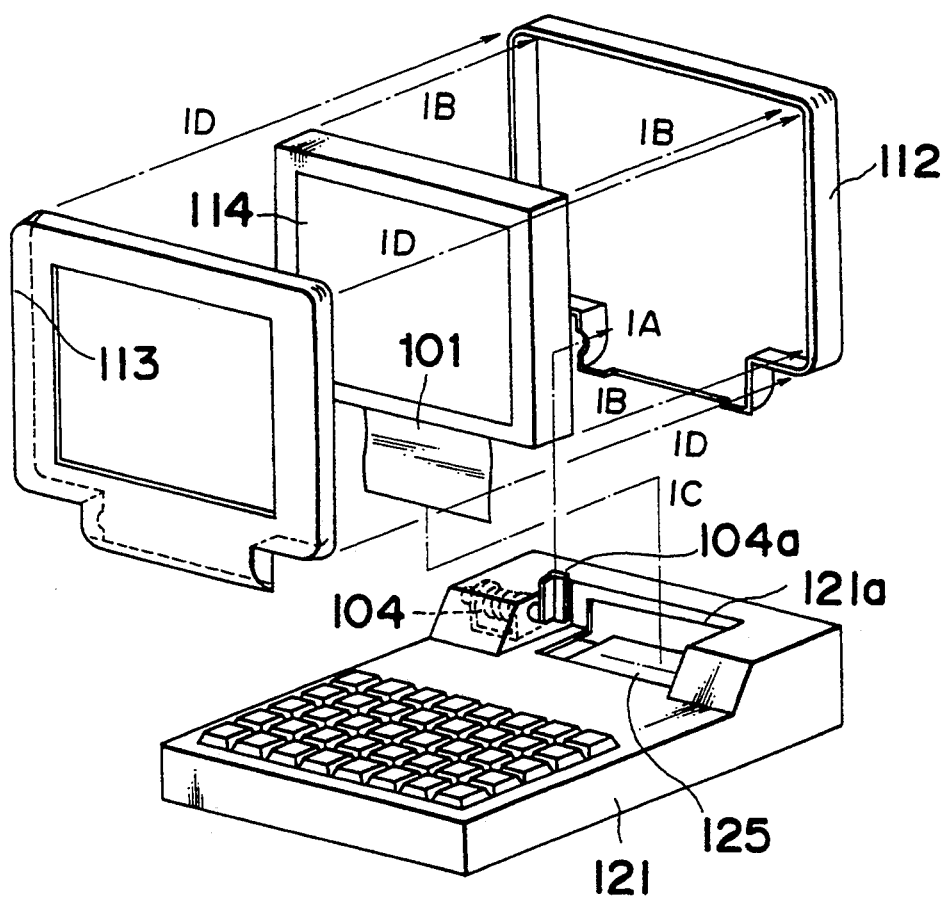
FIG. 9 is a perspective view showing a method for manufacturing the conventional electronic apparatus of FIG. 5.

FIG. 2 is a perspective view showing a schematic construction of the electronic apparatus shown in FIG. 1. FIG. 3 is a perspective view showing a schematic construction of the display section of the electronic apparatus shown in FIG. 2 and a method for manufacturing the display section. FIG. 4 is a perspective view showing a schematic construction of the display section in the vicinity of the rotary portion thereof and a method for installing the display section on the main body section by means of a jig.

Referring to FIG. 2, a display casing 11 accommodates the display means 14 of the display section 10. A main body casing 21 accommodates the image output means 25, the key board 26, the I/O circuit 27, the CPU 28, and the memory 29. Keys of the keyboard 26 project from an open portion 21a of the keyboard 26.

Referring to FIG. 3, a rear cover 12 and a front cover 13 compose the display casing 11. The display surface 15a of the display 15 is seen from an open portion 13a of the front cover 13. The image transmitting means 1 comprises a flexible cable which is sheet-shaped and has a wiring pattern printed thereon. The image transmitting means 1 is U-shaped, i.e., the flexible cable comprises a base portion 1a extending widthwise and leg portions 1b and 1c extending lengthwise. Reference numerals 2 and 3 denote plate-shaped guide members (or securing members) which constitute a fixing member to fix the base portion 1a to the display casing 11. Reference numeral 4 denotes a hinge unit which supports a torque load greater than a certain value at a given rotational angle thereof.

The method for assembling the display section 10 is described below with reference to FIG. 3. First, one end of the U-shaped image transmitting means 1 is connected with the display-driving means 16 disposed in the display means 14 as shown by an arrow (A) and then, the image transmitting means 1 and the display means 14 are installed on the rear cover 12 as shown by an arrow (B). As a result, the image transmitting means 1 is accommodated in the display casing 11 in the range from the portion connected with the display-driving means 16 to a certain point of the portion 1a. Then, as shown by arrows (C), (D), and (E), the portion 1a of the image transmitting means 1 is fixed to the rear cover 12 with the portion 1a sandwiched between the guide members 3 and 2. One end 4a of the hinge unit 4 is fixed to the rear cover 12 as shown by an arrow (F). At this time, the portion 1a is disposed in the vicinity of the rotational center of the hinge unit 4. Finally, as shown by an arrow (G), the front cover 13 is installed on the rear cover 12.

FIG. 4 is a perspective view showing the construction of the display casing 11, shown in FIGS. 1, 2, and 3, to be installed on the main body casing 21 by means of a jig. A main casing 22 accommodates the image output means 25, the keyboard 26, the I/O circuit 27, the CPU 28, and the memory 29. A connector 25a of the image output means 25 to be connected with the image transmitting means 1 is seen from an open portion 22a of the main casing 22. The main body casing 21 is composed of the main casing 22; a cable cover 23 mounted on the main casing 22 and accommodating a portion of the image transmitting means 1 projecting from the display casing 11; and a hinge cover 24 installed on the main casing 22 and accommodating a portion of the hinge unit 4 projecting from the display casing 11. A jig 30 is used to install the display casing 11 in position on the main body casing 21. The jig 30 comprises a substrate 30a, guide pins 30b, 30c, 30d, and 30e, and guide pins 30f, 30g, and 30h. The guide pins 30b, 30c, 30d, and 30e serve as a means for regulating the positioning of the display casing 11 and the main body casing 21 in the width direction thereof. The guide pins 30f, 30g, and 30h serve as a means for regulating the positioning of the display casing 11 and the main body casing 21 in the width direction thereof.

The method for installing the display casing 11 on the main body casing 21 is described below with reference to FIG. 4. First, the display casing 11 and the main body casing 21 are placed on the jig 30 along the guide pins 30b through 30h with the display casing 11 placed on the main body casing 21. Then, the hinge unit 4 is fixed to the main casing 22. In this manner, the display casing 11 is fixed in position to the main body casing 21. Therefore, the jig 30 may be removed from the main body casing 21. The hinge unit 4 supports the display casing 11 by means of one end 4a thereof. In order to operate the keys of the keyboard 26 while an operator is viewing the display surface 15a, the operator pivots the display casing 11 in a first director to stand the display casing 11 upright. When the electronic apparatus, namely, the computer is not used, the operator pivots the display casing 11 in a second opposite direction to stop the display casing 11 at a desired position (angle). Then, the portion 1b of the image transmitting means 1 is spirally wound one and a half to two turns to connect the portion 1b of the image transmitting means with the connector 25a of the image output means 25. Finally, the cable cover 23 and the hinge cover 24 are installed on the main body casing 21.

In the electronic apparatus having the above-described construction, the image transmitting means 1 can be disposed in the vicinity of the pivotal axis of the display casing 11. This construction eliminates the need for forming a large opening through which the image transmitting means 1 passes from the display casing 11 to the main body casing 21 and allows the pivotal axis of the display casing 11 and the hinge unit 4 to be disposed at the rear end of the main body casing 21. Consequently, the apparatus can be short in depth. Further, the display casing 11 is pivoted with the portion 1b of the image transmitting means 1 wound spirally. Accordingly, the image transmitting means 1 can be bent by utilizing the space of the cable cover 23 to the maximum, namely, at a radius of curvature three to five times as large as that of the conventional one. Consequently, the display casing 11 can be smoothly pivoted without being influenced by the rigidity of the image transmitting means 1 and in addition, the bending-resistant performance of the image transmitting means 1 is tens to hundreds of times as large as that of the conventional one. In addition, in the image transmitting means 1, the guide members 2 and 3 prevent the spirally wound portion 1b from applying the torsion force of the portion 1a connected with the portion 1b. Thus, the image transmitting means 1 operates reliably.

The configuration of the U-shaped image transmitting means 1 allows a material to be used at a high efficiency.

In addition, according to the above-described manufacturing method, the display casing 11 can be mounted in position on the main body casing 21, and the display casing 11 accommodating the display means 14 can be removably mounted on the main body casing 21. Therefore, the maintenance of the display means 14 can easily performed.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An electronic apparatus comprising:
    a main body casing;
    an image output section accommodated in said main body casing;
    a display casing rotatably mounted to said main body casing for rotation about a rotational axis extending in a width direction of said apparatus;
    a display section accommodated in said display casing;
    an image transmitting member having a first end operably coupled with said display section and a second end operably coupled with said image output section; and
    wherein said image transmitting member comprises a sheet material having a wiring pattern thereon, said sheet material being formed in a U-shape which includes a base portion which extends in said width direction and has first and second ends, a first leg portion perpendicular to said base portion and having a first end connected to said first end of said base portion and a second end which constitutes said first end of said image transmitting member, and a second leg portion perpendicular to said base portion and having a first end connected to said second end of said base portion and a second end which constitutes said second end of said image transmitting member.

2. An electronic apparatus as recited in claim 1, wherein
    said first leg portion of said image transmitting member is disposed at least partially in said display casing;
    said second leg portion of said image transmitting member is disposed at least partially in said main body casing;
    said base portion of said image transmitting member is disposed in the vicinity of said rotational axis; and
    one of said first and second leg portions of said image transmitting member is wound into a spiral formation.

3. An electronic apparatus as recited in claim 2, further comprising
    a fixing member fixing said base portion of said image transmitting member to one of said main body casing and said display casing.

4. An electronic apparatus as recited in claim 3, wherein
    said fixing member comprises a pair of plate-shaped securing members; and
    said base portion of said image transmitting member is sandwiched between said plate-shaped securing members.

5. An electronic apparatus as recited in claim 2, wherein
    said one of said first and second leg portions which is wound into said spiral formation comprises said second leg portion.

6. An electronic apparatus as recited in claim 1, further comprising
    a fixing member fixing said base portion of said image transmitting member to one of said main body casing and said display casing.

7. An electronic apparatus as recited in claim 6, wherein
    said fixing member comprises a pair of plate-shaped securing members; and
    said base portion of said image transmitting member is sandwiched between said plate-shaped securing members.

8. An electronic apparatus as recited in claim 1, wherein
    said base portion of said image transmitting member is disposed in the vicinity of said rotational axis; and
    one of said first and second leg portions of said image transmitting member is wound into a spiral formation.

9. An electronic apparatus comprising:
    a display casing;
    a display section accommodated in said display casing;
    a main body casing having a front end and a rear end;
    image output means, accommodated in said main body casing, for outputting an image signal to said display section;
    an operation portion accommodated in said main body casing and comprising a keyboard;

control means, accommodated in said main body casing, for controlling data input from said operation portion and data output of said image output means;

a hinge unit rotatably mounting said display casing to said main body casing for pivotal movement about a rotational axis between a closed position overlying said main body casing and an open position standing upwardly from said main body casing, said rotational axis being disposed at said rear end of said main body casing;

an image transmitting member operably connecting said image output means with said display section;

wherein said image transmitting member comprises a sheet material having a wiring pattern thereon, said sheet material having a first end extending to said display casing and a second end extending to said main body casing; and wherein said sheet material of said image transmitting member is wound in a spiral formation at a portion thereof between said first and second ends thereof.

10. An electronic apparatus as recited in claim 19, wherein said sheet material of said image transmitting member is formed in a U-shape so as to include a base portion which extends in said width direction and has first and second ends, a first leg portion perpendicular to said base portion and having a first end connected to said first end of said base portion and a second end which constitutes said first end of said image transmitting member, and a second leg portion perpendicular to said base portion and having a first end connected to said second end of said base portion and a second end which constitutes said second end of said image transmitting member.

11. An electronic apparatus as recited in claim 10, wherein said first leg portion of said image transmitting member is disposed at least partially in said display casing;

said second leg portion of said image transmitting member is disposed at least partially in said main body casing;

said base portion of said image transmitting member is disposed in the vicinity of said rotational axis; and said portion of said image transmitting member which is wound into said spiral formation comprises said second leg portion.

12. An electronic apparatus as recited in claim 11, further comprising a fixing member fixing said base portion of said image transmitting member to one of said main body casing and said display casing.

13. An electronic apparatus as recited in claim 12, wherein said fixing member comprises a pair of plate-shaped securing members; and said base portion of said image transmitting member is sandwiched between said plate-shaped securing members.

14. An electronic apparatus as recited in claim 11, wherein said base portion of said image transmitting member is disposed in the vicinity of said rotational axis; and said portion of said image transmitting member which is wound into said spiral formation comprises said second leg portion.

15. A method for manufacturing an electronic apparatus comprising the steps of:

connecting a first end of an image transmitting member to a display section;

fixing a hinge unit to a display casing;

providing said display section in said display casing;

providing an image output section in a main casing adjacent an opening therein;

locating said display casing in position on said main casing by placing said main casing on an alignment jig and then placing said display casing on said alignment jig;

fixing a rotatable portion of said hinge unit to said main casing to rotatably connect said display casing to said main casing;

winding a portion of said image transmitting member into a spiral formation and connecting a second end of said image transmitting member through said opening of said main casing to said image output section; and mounting at least one cover on said main casing to cover said hinge unit and said image transmitting member and to form a main body casing.

* * * * *